US010084872B2

(12) United States Patent
Bradley et al.

(10) Patent No.: US 10,084,872 B2
(45) Date of Patent: Sep. 25, 2018

(54) BEHAVIOR BASED NOTIFICATIONS

(71) Applicant: International Business Machines Corporation, Armonk, NY (US)

(72) Inventors: Lisa M. W. Bradley, Cary, NC (US); Brian O'Donovan, Castleknock (IE); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 14/800,954

(22) Filed: Jul. 16, 2015

(65) Prior Publication Data

US 2017/0019358 A1  Jan. 19, 2017

(51) Int. Cl.
*G06F 15/16* (2006.01)
*H04L 29/08* (2006.01)
*H04L 12/58* (2006.01)

(52) U.S. Cl.
CPC .............. *H04L 67/22* (2013.01); *H04L 51/14* (2013.01); *H04L 51/16* (2013.01); *H04L 51/32* (2013.01); *H04L 67/306* (2013.01)

(58) Field of Classification Search
CPC .......... G06Q 10/107; G06Q 10/0633; G06Q 10/103; G06Q 10/0631; G06Q 10/06311; G06Q 10/1097; G06Q 10/10; G06Q 10/06316; G06Q 10/06398; H04L 51/32; H04L 51/16; H04L 63/102; H04L 67/22; H04L 51/14; H04L 67/306
USPC ....................................................... 709/206
See application file for complete search history.

(56) References Cited

U.S. PATENT DOCUMENTS

| | | | | |
|---|---|---|---|---|
| 5,548,636 A | * | 8/1996 | Bannister | H04M 3/248 379/390.01 |
| 6,075,851 A | * | 6/2000 | Pinard | H04M 1/2745 379/120 |
| 6,346,952 B1 | * | 2/2002 | Shtivelman | G06F 17/277 707/999.005 |
| 7,328,242 B1 | * | 2/2008 | McCarthy | G06Q 10/10 709/203 |
| 7,568,151 B2 | | 7/2009 | Bargeron et al. | |

(Continued)

FOREIGN PATENT DOCUMENTS

WO  02093886 A2  11/2002

*Primary Examiner* — Imad Hussain
(74) *Attorney, Agent, or Firm* — Brian J. Colandreo, Esq.; Jeffrey T. Placker, Esq.; Holland & Knight LLP (57) ABSTRACT

A computing system, computer-implemented method, and computer program product are provided for facilitating behavior based notifications concerning multiparty communication threads. According to an implementation, the computer-implemented method may include defining a rules set associated with a user for participation in a multiparty communication thread. The method may also include evaluating a plurality of communications associated with the multiparty communication thread. The method may also include determining when a given communication associated with the multiparty communication thread satisfies one or more of the rules included within the rules set. The method may further include delivering the given communication based upon, at least in part, a determining that the given communication satisfies the one or more rules.

17 Claims, 3 Drawing Sheets

(56) References Cited

U.S. PATENT DOCUMENTS

| | | | |
|---|---|---|---|
| 7,752,279 B2* | 7/2010 | Hardy | G06Q 10/107 709/206 |
| 7,945,625 B2* | 5/2011 | Sapek | G06Q 10/10 709/204 |
| 8,175,581 B2 | 5/2012 | Heidloff et al. | |
| 8,214,446 B1* | 7/2012 | Siegel | G06F 21/31 705/5 |
| 8,346,864 B1* | 1/2013 | Amidon | H04L 65/1069 709/204 |
| 8,566,400 B2 | 10/2013 | Chen et al. | |
| 8,903,921 B1* | 12/2014 | Snow | G06F 17/30867 709/204 |
| 9,843,552 B2* | 12/2017 | Gedikian | H04L 51/32 |
| 2004/0003042 A1* | 1/2004 | Horvitz | G06Q 10/109 709/204 |
| 2004/0083265 A1* | 4/2004 | Beringer | G06Q 10/10 709/204 |
| 2004/0098462 A1* | 5/2004 | Horvitz | G05B 19/404 709/207 |
| 2004/0101126 A1* | 5/2004 | Ohmori | H04M 3/5183 379/265.01 |
| 2004/0128353 A1* | 7/2004 | Goodman | H04L 12/581 709/204 |
| 2005/0027696 A1* | 2/2005 | Swaminathan | G06Q 10/06 |
| 2005/0203775 A1* | 9/2005 | Chesbrough | G06Q 50/22 705/2 |
| 2007/0033103 A1* | 2/2007 | Collins | G06F 17/2785 705/14.41 |
| 2007/0180036 A1 | 8/2007 | Hebert et al. | |
| 2007/0264948 A1* | 11/2007 | Jansson | G06F 1/3203 455/127.5 |
| 2008/0222531 A1* | 9/2008 | Davidson | G06Q 10/107 715/736 |
| 2008/0294727 A1 | 11/2008 | Moody et al. | |
| 2008/0301250 A1* | 12/2008 | Hardy | G06Q 10/107 709/207 |
| 2008/0304647 A1* | 12/2008 | Ikemori | H04M 3/38 379/207.02 |
| 2009/0182823 A1* | 7/2009 | O'Sullivan | G06Q 10/10 709/206 |
| 2009/0234845 A1* | 9/2009 | DeSantis | H04L 43/026 |
| 2010/0107165 A1* | 4/2010 | Koskimies | G06Q 10/06 718/100 |
| 2010/0169888 A1* | 7/2010 | Hare | G06Q 10/107 718/102 |
| 2010/0179860 A1* | 7/2010 | Noel | G06Q 30/02 705/7.33 |
| 2010/0235306 A1* | 9/2010 | Wagoner | G06Q 10/06 706/12 |
| 2010/0269110 A1* | 10/2010 | Leijen | G06F 9/505 718/100 |
| 2011/0004635 A1* | 1/2011 | Chesbrough | G06Q 50/22 707/803 |
| 2011/0185025 A1* | 7/2011 | Cherukuri | H04L 12/1813 709/206 |
| 2011/0264737 A1* | 10/2011 | Skinner | G06Q 10/10 709/204 |
| 2012/0005282 A1* | 1/2012 | Steinbok | G06F 17/30707 709/206 |
| 2012/0084215 A1* | 4/2012 | Trier | G06Q 10/06 705/301 |
| 2012/0101970 A1* | 4/2012 | Zernik | G06Q 10/10 706/45 |
| 2012/0210334 A1* | 8/2012 | Sutedja | G06Q 10/107 719/314 |
| 2013/0031189 A1* | 1/2013 | Lam | G06Q 10/107 709/206 |
| 2013/0212189 A1* | 8/2013 | Velissarakos | G06Q 10/10 709/206 |
| 2014/0129642 A1* | 5/2014 | Schneider | G06Q 10/06 709/205 |
| 2014/0129661 A1 | 5/2014 | Thyagaraja | |
| 2014/0189533 A1 | 7/2014 | Krack et al. | |
| 2014/0195621 A1* | 7/2014 | Rao DV | H04L 12/1827 709/206 |
| 2015/0025904 A1* | 1/2015 | Rao | G06Q 50/22 705/2 |
| 2015/0032827 A1* | 1/2015 | Tyler | H04L 51/16 709/206 |
| 2015/0163258 A1* | 6/2015 | Garcia, III | H04L 67/24 709/204 |
| 2015/0317892 A1* | 11/2015 | Raj | G08B 21/18 340/6.1 |
| 2015/0356495 A1* | 12/2015 | Virdi | G06Q 10/063114 705/7.15 |
| 2016/0080485 A1* | 3/2016 | Hamedi | H04L 67/02 709/204 |
| 2016/0087924 A1* | 3/2016 | Ramalingam | H04L 51/22 709/206 |
| 2016/0132318 A1* | 5/2016 | Hu | G06F 8/65 717/172 |
| 2016/0334770 A1* | 11/2016 | Laycock | G05B 23/027 |

* cited by examiner

BEHAVIOR BASED NOTIFICATIONS

TECHNICAL FIELD

The present disclosure generally relates to systems and method for electronic collaboration, and more particularly relates to providing behavior based notifications of communications within a multiparty communication thread.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, exchange and share content, such as ideas, thoughts, or creations, and participate in interactive discussions using email or other group messaging systems, blogs, forums, wikis, and social networking applications. However, sometimes the ease with which information may be shared with others can create a situation of information overload. Because large numbers of people can be added to an electronic exchange or discussion, the result can often be that individuals who may not need, or want, to be involved in the exchange may be added anyway. Once a person is added to the exchange, it becomes her task to now manage the often large volume of messages arising from the exchange.

SUMMARY OF DISCLOSURE

According to an implementation, a computer-implemented method may include defining, by a processor, a rules set associated with a user for participation in a multiparty communication thread. The method may also include evaluating, by the processor, a plurality of communications associated with the multiparty communication thread. The method may also include determining when a given communication associated with the multiparty communication thread satisfies one or more of the rules included within the rules set. The method may further include delivering, by the processor, the given communication based upon, at least in part, a determining that the given communication satisfies the one or more rules.

One or more of the following features may be included. The rules set may be based upon, at least in part, a user profile established for the user. The rules set may be based upon, at least in part, a role associated with the user. The rules set may be based upon, at least in part, a historical behavior pattern associated with the user for multiparty communication threads.

The rules set may be based upon, at least in part, a number of communications included within the multiparty communication thread. The rules set may be based upon, at least in part, a time-wise aspect of the multiparty communication thread. The rules set may be based upon, at least in part, an indication of a completion of an action associated with the multiparty communication thread.

According to another implementation, a computer program product may include a non-transitory computer-readable medium having a plurality of instructions stored on it. When the instructions are executed by a processor, the instructions may cause the processor to perform operations including defining a rules set associated with a user for participation in a multiparty communication thread. Instructions may also be included for evaluating a plurality of communications associated with the multiparty communication thread. Instructions may also be included for determining when a given communication associated with the multiparty communication thread satisfies one or more of the rules included within the rules set. Instructions may further be included for delivering the given communication based upon, at least in part, a determining that the given communication satisfies the one or more rules.

One or more of the following features may be included. The rules set may be based upon, at least in part, a user profile established for the user. The rules set may be based upon, at least in part, a role associated with the user. The rules set may be based upon, at least in part, a historical behavior pattern associated with the user for multiparty communication threads.

The rules set may be based upon, at least in part, a number of communications included within the multiparty communication thread. The rules set may be based upon, at least in part, a time-wise aspect of the multiparty communication thread. The rules set may be based upon, at least in part, an indication of a completion of an action associated with the multiparty communication thread.

According to yet another implementation, a computing system may include a processor device, and a memory architecture coupled with the processor device. The processor device may be configured for defining a rules set associated with a user for participation in a multiparty communication thread. The processor device may also be configured for evaluating a plurality of communications associated with the multiparty communication thread. The processor device may also be configured for determining when a given communication associated with the multiparty communication thread satisfies one or more of the rules included within the rules set. The processor device may further be configured for delivering the given communication based upon, at least in part, a determining that the given communication satisfies the one or more rules.

One or more of the following features may be included. The rules set may be based upon, at least in part, a user profile established for the user. The rules set may be based upon, at least in part, a role associated with the user. The rules set may be based upon, at least in part, a historical behavior pattern associated with the user for multiparty communication threads.

The rules set may be based upon, at least in part, a number of communications included within the multiparty communication thread. The rules set may be based upon, at least in part, a time-wise aspect of the multiparty communication thread.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Individuals may often engage in collaborations using electronic collaboration systems to share content with one another. Various different collaboration systems may allow users to exchange messages or content directly with each other, such as via email or other messaging systems; to post content to a shared space, such as a shared team space, blog, forum, social networking sites, wiki, or the like; or to otherwise transmit content to other participants of a collaboration session. Often, with such collaboration systems, there is little, or even no, real additional overhead associated with adding additional people to the exchange of content, either in terms of computing resources or in terms of time and effort required by an individual to add the other people. As a result, a situation of over-inclusion may occur, or even become the norm, with many people who may not have a need, or even an interest, in the exchange becoming party to the collaboration. For example, a manager may initiate a project, and may want to be informed of the outcome. However, the manager may not need, or want, to receive all of the exchanges that occur as a team works on the project. Consistent with some embodiments, the present disclosure may provide an opportunity for individual to control, or manage, the content that they may receive as a result of being included in such exchanges. In some embodiments, the present disclosure may provide a dynamic approach to understanding the context of a person with respect to an exchange of content, and may provide her with an appropriate level of awareness and/or engagement with the ongoing exchanges.

For example, in some illustrative embodiments, the present disclosure may develop and apply rules for managing a user's involvement in and/or awareness of a multiparty communication thread that the user is included on. In general, a multiparty communication thread may include a series of communications (such as emails; postings to a team space, wiki, blog, forum, etc.; or other content exchanges among the participants) that may generally surround a common topic and an at least partially overlapping participant set (e.g. which may grow or shrink over time as participants are added or removed from the communication thread). An example of a multiparty communication thread may include an email chain, including an original email and a series of subsequent replies and forwards of the original email. As the email chain progresses, additional recipients may be added to the chain, and some participants may be removed from the chain. Other multiparty communication threads may similarly allow exchanges of ideas and content among a group of participants (e.g., which may vary overtime) with the participants either directly receiving new contributions to the communication thread, or being alerted of such new contributions. The rules that may be developed and applied consistent with the present disclosure may influence or control when, if, and/or how a participant of the multiparty communication thread receives updates (e.g., new contributions or communications) to the communication thread. Receiving updates to the communication thread may include receiving the update itself, and/or receiving some notification that an update has occurred.

In some embodiments, the rules that are developed and/or applied for controlling how a user receives updates to the communication thread may be based upon, at least in part, a role of the user with respect to the communication thread, one or more of the other participants in the communication thread, an organization (such as a company), or the like. In some embodiments, the rules may be based upon, at least in part, a context of the user relative to the subject of the communications. Further, in some embodiments, the rules may be based upon, at least in part, an awareness of the user's past behavior with respect to similar multiparty communication threads. The awareness of the user's past behavior may include an awareness of the subject matter of the communication thread, a role of the user, and the like.

In some embodiments, the present disclosure may implement the rules to analyze updates to the multiparty communication thread to determine when, or if, the user should receive the update. As such, the present disclosure may manage the communications arising from the multiparty communication thread that may actually be provided to the user. In some embodiments, managing the communications that may actually be provided to the user may allow the user to achieve a useful and productive awareness of the topic of the communication thread, a status of the discussion, or state of a project, or the like, without being overwhelmed by a volume of communications that may not be valuable to the user.

Figure 1:
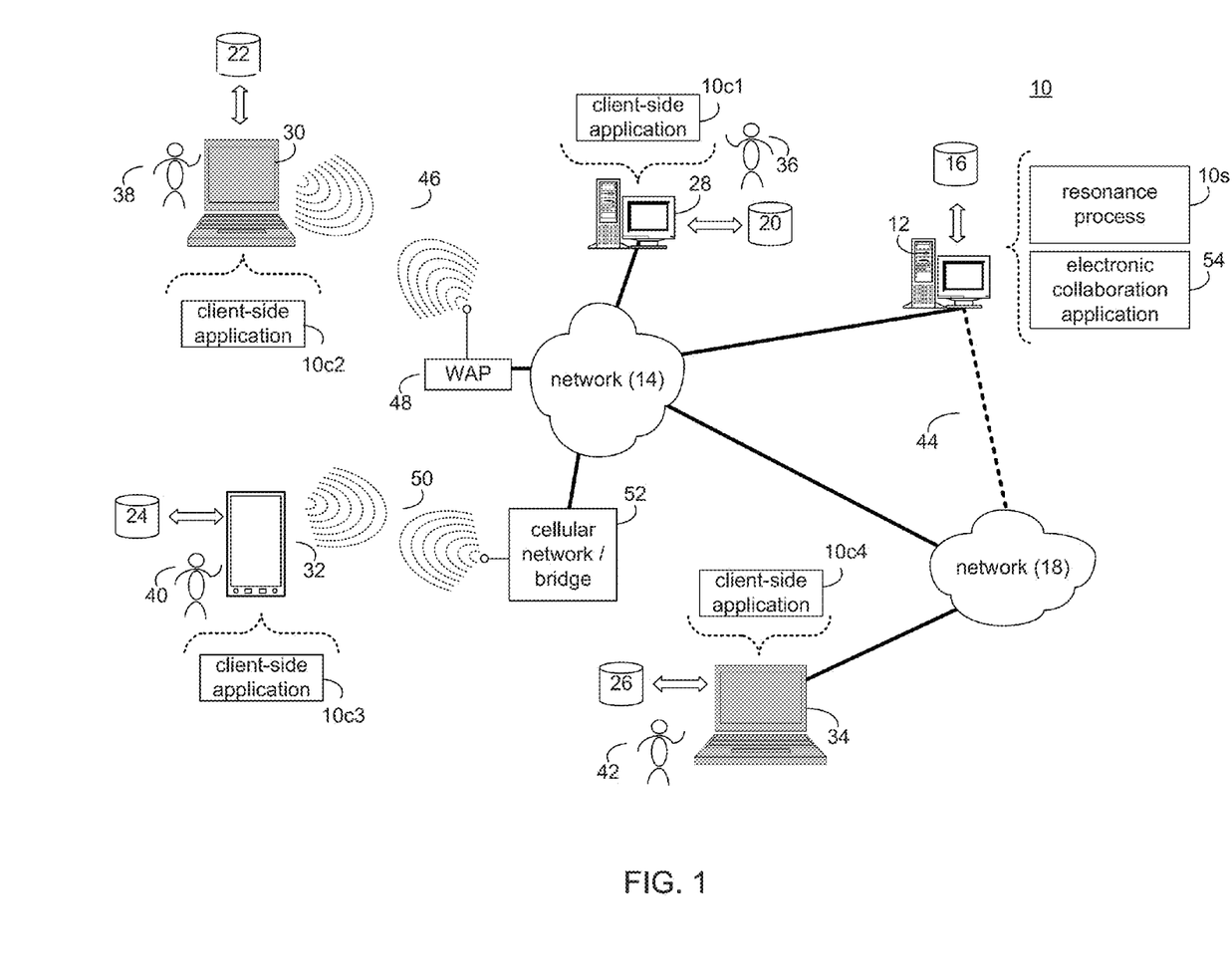
FIG. 1 is a diagrammatic view of a distributed computing network including a computing device that executes a notification process according to an implementation of the present disclosure.

Referring to FIG. 1, there is shown notification process 10. For the following discussion, it is intended to be understood that notification process 10 may be implemented in a variety of ways. For example, notification process 10 may be implemented as a server-side process, a client-side process, or a server-side/client-side process.

For example, notification process 10 may be implemented as a purely server-side process via notification process 10s. Alternatively, notification process 10 may be implemented as a purely client-side process via one or more of client-side application 10c1, client-side application 10c2, client-side application 10c3, and client-side application 10c4. Alternatively still, notification process 10 may be implemented as a server-side/client-side process via server-side notification process 10s in combination with one or more of client-side application 10c1, client-side application 10c2, client-side application 10c3, and client-side application 10c4. In such an example, at least a portion of the functionality of notification process 10 may be performed by notification process 10s and at least a portion of the functionality of notification process 10 may be performed by one or more of client-side application 10c1, 10c2, 10c3, and 10c3.

Accordingly, notification process 10 as used in this disclosure may include any combination of notification process 10s, client-side application 10c1, client-side application 10c2, client-side application 10c3, and client-side application 10c4.

Figure 2:
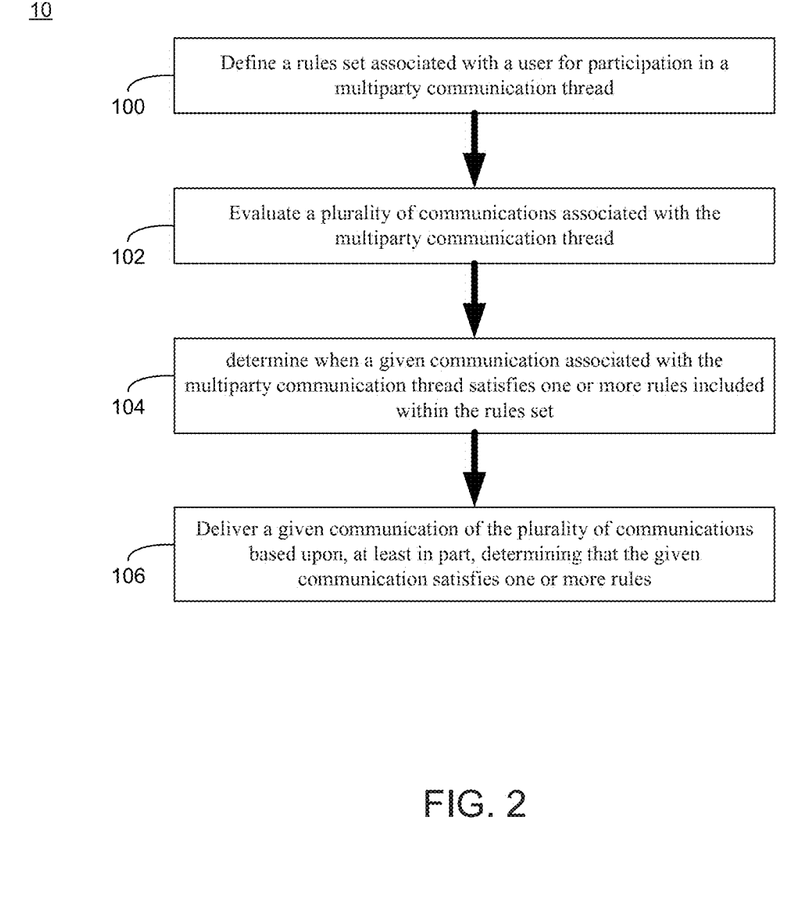
FIG. 2 is a flowchart of the notification process of FIG. 1, according to an implementation of the present disclosure.

Referring also to FIG. 2, and as will be discussed in greater detail below, notification process 10 may define 100 a rules set associated with a user for participation in a multiparty communication thread. Notification process 10 may also evaluate 102 a plurality of communications associated with the multiparty communication thread. Notification process may also determine 104 when a given communication associated with the multiparty communication thread satisfies one or more of the rules included within the rules set. Notification process 10 may further deliver 106 the given communication based upon, at least in part, a determining that the given communication satisfies the one or more rules.

Notification process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of notification process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of an email application, a social networking application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access notification process 10 directly through network 14 or through secondary network 18. Further, notification process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, notification process 10 may communicate with, interact with, and/or include a component or module of a collaboration application (e.g., collaboration application 54). As is generally known, a collaboration application (e.g., collaboration application 54) may generally facilitate text, graphical, multi-media, audio, and/or video collaboration between individuals as participants in a multiparty communication thread. Examples of collaboration application 54 may include, but are not limited to, an email application, an application that supports forums for user posted content, wikis, social networking applications, team rooms, and the like. For example, collaboration application 54 may allow multiple users to exchange content (such as text-based content, graphical content, etc.) for consumption by other participants in the multiparty communication thread. The multiparty communication thread may include two or more participants in the communication thread. In some embodiments, a multiparty communication thread may include significantly more than two participants.

In an embodiment, the instruction sets and subroutines of electronic collaboration application 54 may be stored, e.g., on storage device 16 associated with server computer 12, which executes electronic collaboration application 54, and/or another suitable storage device. Further, users (e.g., one or more of users 36, 38, 40, 42) may access electronic collaboration application 54 in order to participate in a communication thread (such as an email thread; an exchange of postings to a forum, wiki, or social networking page or site; or the like). The users may access electronic collaboration application 54 via one or more suitable applications, such as client side applications 10c1-10c4 (e.g., which may include an email application, a web browser) and/or via a different application (not shown).

As generally discussed above, a portion and/or all of the functionality of notification process 10 may be provided by one or more of client side applications 10c1-10c4. For example, in some embodiments notification process 10 (and/or client-side functionality of notification process 10) may be included within and/or may interact with client-side applications 10c1-10c4, which may include client side electronic collaboration applications, web browsers, or another application. In other embodiments, a portion and/or all of the functionality of notification process may be provided by electronic collaboration application 54, and/or another server-side application. Various additional/alternative configurations may be equally utilized.

As generally discussed above with reference to FIG. 2, notification process 10 may define 100 a rules set associated with a user for participation in a multiparty communication thread. Notification process 10 may also evaluate 102 a plurality of communications associated with the multiparty communication thread. Notification process may also determine 104 when a given communication associated with the multiparty communication thread satisfies one or more of the rules included within the rules set. Notification process 10 may further deliver 106 the given communication based upon, at least in part, a determining that the given communication satisfies the one or more rules.

In an illustrative example, notification process 10 may facilitate managing a user's involvement in a multiparty communication thread, e.g., by controlling or adapting when, or if, the user receives updates to the communication thread. For example, the communication thread may be related to the development, testing, and quality assurance associated with a new feature to a software product. The user may be a manager overseeing several software development teams, and as such may not need to participate in every communication associated with the development, testing, and quality assurance of the particular feature of the particular software product. Rather, the user may only be generally interested in knowing that progress on the project is being made, the current state of the project, and/or when the project has been completed. As such, the level of user's involvement (e.g., in terms of the number, timing, and/or content of the updates to the communication thread) may be adapted to provide an improved degree of value for the user (e.g., in terms of receiving the necessary information but not expending unnecessary time on communications from the thread). That is, notification process 10 may allow the user to receive updates frequently enough, or of a relevant content, to achieve a desired level of insight into the communication thread or an underlying activity associated with the communication thread. In some embodiments, notification process 10 may also reduce the overall number of updates to the communication thread that are received by the user, such that the time and overhead expended by the user in managing the updates to the communication thread may be reduced to an appropriate level.

Consistent with the foregoing, notification process 10 may define 100 a rules set associated with a user for participation in a multiparty communication thread. The rules set associated with the user may generally govern whether or not a particular communication within the multiparty communication thread (e.g., an update to the communication thread) should be provided to the user. As such, the rules may generally govern when the user should receive a particular update to the communication thread, how many updates the user should receive from the communication thread, and/or which updates to the communication thread the user should receive. It will be appreciated that various users (even as participants in the same multiparty communication thread), may utilize different rules sets. As such, different users may receive different numbers of updates to the communication thread, may receive updates to the communication thread at different frequencies, and/or may receive different individual updates to the communication thread.

The rules set may be based upon, at least in part, a number of communications included within the multiparty communication thread. For example, the rules may indicate a frequency with which the user should receive updates to the communication thread based upon the number of communications included within the multiparty communication thread. In an embodiment, such rules may be applied in absolute numerical terms. For example, a rule may provide that the user may receive every tenth update to the communication thread, or some other established number. In some embodiments, a rule may be applied in variable numerical terms. For example, for a communication thread having a greater number of updates, the user may receive less frequent updates (in terms of the total number of updates to the communication thread), while for a communication thread having a relatively fewer number of updates, the user may receive relatively more frequent updates. For example, a rule may specify that the user may receive one update for every n/5 updates to the communication thread, where n may equal the currently total number of updates that have been made in the communication thread. Further, in some embodiments, the rules set may specify that the frequency of the updates to be received by the user may also, or alternatively, be based upon, at least in part, the number of participants in the communication thread.

The rules set may be based upon, at least in part, a time-wise aspect of the multiparty communication thread. In an embodiment, the rules set may indicate that the user may receive a specified number of updates to the communication thread per specified time period. For example, the rules set may indicate that the user may receive one update to the communication thread every, one update to the communication thread every three days, or another suitable number of updates per specified time period. In some embodiments, one or more of the number of updates to be received and the specified time period may be based upon, at least in part, a relative number of updates that have been made to the communication thread, the number of participants of the communication thread, and/or one or more additional and/or alternative criteria. Further, in an embodiment, the rules set may indicate that the user may receive an update to the communication thread after a specified period of inactivity. For example, the rules set may indicate that the user may receive the most recent update to the communication thread after two days (or some other specified time period) of inactivity. A time period of inactivity may, for example, include a time period since the last update to the communication thread was made. According to such an example, when no updates to the communication thread have been made in two days, the rules may indicate that the user may receive the last update that was made to the communication thread (i.e., the update made two days ago). In such an embodiment, the rules set may, for example, allow the user to ensure that a project or activity does not become stagnant, or to determine why activity has ceased. In some embodiments, the time period of inactivity may be based upon, at least in part, the total number of updates to the communication thread, the number of participants to the communication thread, calendar events (such as weekends, holidays, scheduled absences or activities associated with one or more participants of the communication thread, etc.), and/or other criteria.

The rules set may be based upon, at least in part, an indication of a completion of an action associated with the multiparty communication thread, and/or another textual or informational attribute associated with an update to the communication thread. For example, updates to the communication thread may be textually analyzed to determine one or more content attributes of the update, to identify key terms, or the like. Based upon, at least in part, the textual analysis of an update, one or more informational attributes of the update may be determined. For example, textual analysis of an update may indicate that a solution has been given, that a project item has been completed, that a problem has occurred, etc. According to various embodiments, rules sets may be defined 100 that may identify different textual or informational attributes that may trigger delivery of the update to the user.

In some embodiments, the rules set may be based upon, at least in part, one or more explicitly defined, or selected, rules. For example, notification process 10 may provide (e.g., via a graphical user interface) a user with a variety of rules options (e.g., a numerical frequency with which updates should be provided, a time-wise frequency with which updates should be provided, an event-based trigger for providing updates, a textual or informational trigger for providing updates, or the like). The user may explicitly select (e.g. via the graphical user interface) which rules she would like to employ. Similarly, the user may specify rules attributes (e.g., frequency values, time values, textual or informational triggers, etc.) that may be utilized in connection with notification process 10. Based upon, at least in part, the user selections and/or rules attributes, notification process 10 may define 100 the rules set associated with the user for managing updates to a multiparty communication thread.

In some embodiments, notification process 10 may define 100 the rules set for all multiparty communication threads. In other embodiments, notification process 10 may define 100 the rules set individually for each multiparty communication thread (e.g., notification process 10 may define 100 a different rules set for each different communication thread). In further embodiments, notification process 10 may define 100 a rules set (and/or apply one or more predefined rules sets) to a multiparty communication thread based upon, at least in part, one or more attributes of the communication thread. Examples of attributes of the communication thread may include, for example, a subject of the communication thread (e.g., which may be specified by a user and/or determined via textual analysis), one or more participants in the communication threat (e.g., which may include one or more defined groups of participants), a number of participants associated with the communication thread, and/or another attribute of the communication thread. In some embodiments, the user may explicitly specify which rules set should be employed with respect to a communication thread, or a communication thread having one or more identified attributes. In some embodiments, notification process 10 may define 100 a rules set for a user with respect to a given communication thread based upon, at least in part, behavioral learning, as generally described below.

The rules set may be based upon, at least in part, a user profile established for the user. For example, a user profile established for a user may explicitly identify the rules set for providing the user with updates to a multiparty communication thread. The user profile may include, for example, a user profile associated with a communication application or platform via which the multiparty communication thread is conducted. Additionally/alternatively, the user profile established for the user may include a profile included within a directory (such as a corporate LDAP directory, or the like), and/or some other user profile, which may explicitly identify the rules set for managing updates to a communication thread. In some embodiments, the rules set may be based upon, at least in part, a user profile established for the user that may indicate one or more user attributes that may be utilized, at least in part, to define 100 the rules set. Example of user attributes that may be used, at least in part, to define 100 the rules set may include, but are not limited to, the user's job role, or title; the user's hierarchical position within an organization, such as a company; a subject or area or interest for the user; a user's background or experience; as well as other attributes.

The rules set may be based upon, at least in part, a role associated with the user. For example, the role of the user may include the user's role with respect to the content of the communication thread (e.g., an initiator or the communication thread, an initial recipient of the communication thread, a contributor to the communication thread, etc.), the role of the user with respect to other participants in the communication thread (e.g., manager, team member, member of a different department or group, or the like), the role of the user with respect to an organization (e.g., job description such as developer, software architect, quality assurance engineer, team manager, etc.), or the like. The role of the user may be based upon, e.g., a contextual analysis of the communication thread, a user profile (e.g., with an organization such as a company, with a communication platform on which the communication thread is conducted, or the like). In an embodiment, notification process 10 may define 100 a rules set based upon the role associated with the user. For example, a default set of rules may be associated with different roles. Based upon a determined role associated with the user, notification process 10 may define 100 the default set of rules for a given role with the user. For example, the rules set defined 100 based upon the role associated with the user may be based upon, and/or reflective of, an interplay between the given role and the nature of the communication thread. For example, the user may include a manager, and the communication thread may concern a work item being performed by a group of individuals under the user (in her role as a manger). In such a situation, the user, as a manager, may not need, or want, to receive every update regarding the performance of the work item. However, the user, in her role as a manager, may wish to be kept generally informed as to the progress or state of the work item. As such, the rule set defined 100 for the user (as a manager) with respect to the particular communication thread may provide the user with periodic updates concerning the communication thread. It will be appreciated that different rules sets may be defined based upon different roles and different communication thread attributes, as generally described above. Further, in some embodiments, a default rules set may be defined 100 based upon, at least in part, a role associated with the user and one or more communication thread attributes, and the user may modify the default rules set, e.g., based upon one or more preferences of the user.

The rules set may be based upon, at least in part, a historical behavior pattern associated with the user for multiparty communication threads. In an embodiment, notification process 10 may monitor the interaction patters of the user with respect to multiparty communication threads over time and/or may access data concerning past interactions of the user. For example, notification process 10 may identify whether the user always reads updates to a communication thread, never reads updates to a communication thread, or intermittently (including identifying an associated frequency) reads updates to a communication thread. Further, notification process 10 may identify one or more attributes of the various multiparty communication threats that the user is a participant of, such as topics associated with the communication threads, textual and/or informational attributes of individual updates that the user spends the most and/or least time consuming, the number and identity of the other participants of the communication threads, and the like. Further, notification process 10 may identify various roles of the user with respect to subject matter, participants, and the like of various different multiparty communication threads that the user is a participant of. Based upon, at least in part, various correlations between consumption of updates (e.g., how often, in what manner, etc. does the user read updates to the communication threads), communication thread attributes, and roles associated with the user (with respect to the communication threads, the other participants of the communication thread, etc.), notification process 10 may define a rules set based upon, at least in part, the behavior patterns of the user. It will be appreciated that as the user interacts with an increasing number of multiparty communication threads, the behavior patterns of the user may become more pronounced and/or discernable, e.g., which may allow the defined 100 rules to be further refined over time. Additionally, in some situations, a user's behavior may change over time. As a result of such changed behaviors, notification process 10 may define 100 a changed rule set associated with the user.

Notification process 10 may also evaluate 102 a plurality of communications associated with the multiparty communication thread. For example, when an update to a multiparty communication thread is created (and/or as time elapses since the last update was created), notification process 10 may evaluate the communications associated with the multiparty communication thread based upon the defined 100 rules set. As a result of evaluating 102 the plurality of communications associated with the multiparty communication thread, notification process may also determine 104 when a given communication associated with the multiparty communication thread satisfies one or more of the rules included within the rules set. For example, for a defined 100 rule that the user should receive every $20^{th}$ update to the communication thread, when an update to the communication thread is created by a participant of the thread, notification process 10 may evaluate the update based upon the rule, e.g., to determine how many updates have been created since the last update was received by the user. If notification process 10 determines 104 that 19 previous updates have been created since the last update was received by the user, notification process 10 may determine 104 that the current update (i.e., the $20^{th}$ update) satisfies a rule within the rules set. As discussed above, the defined 100 rules set may include a plurality of different rules. As such, notification process 10 may similarly evaluate 102 the plurality of communications associated with the communication thread with respect to each of the rules included within the rules set. Further, communication process 10 may determine 104 when a given communication satisfies any of the rules within the defined rules set.

Notification process 10 may further deliver 106 the given communication based upon, at least in part, a determining that the given communication satisfies the one or more rules. Continuing with the above example, as the most recently created communication may be the $20^{th}$ communication since the last update with received by the user, notification process 10 may deliver 106 the most recently created communication to the user, consistent with the defined rules set. In a situation in which the given communication does not satisfy a rule included within the rules set, notification process 10 may not deliver the given communication to the user. In some embodiments, communications that are not delivered to the user may be never transmitted to the user, may be deleted (e.g., from an inbox for communications associated with the user), may be automatically filed in a designated directory, and/or may be otherwise manages. It will be appreciated that notification process 10 may define one or more rules for managing communications that do not satisfy one or more rules within the rules set. In a similar manner as discussed above for defining 100 the rules set, rules for managing communications that are not delivered may be explicitly defined, defined based upon a role of the user, defined based upon behavioral analysis of the user, and/or may be otherwise defined.

Figure 3:
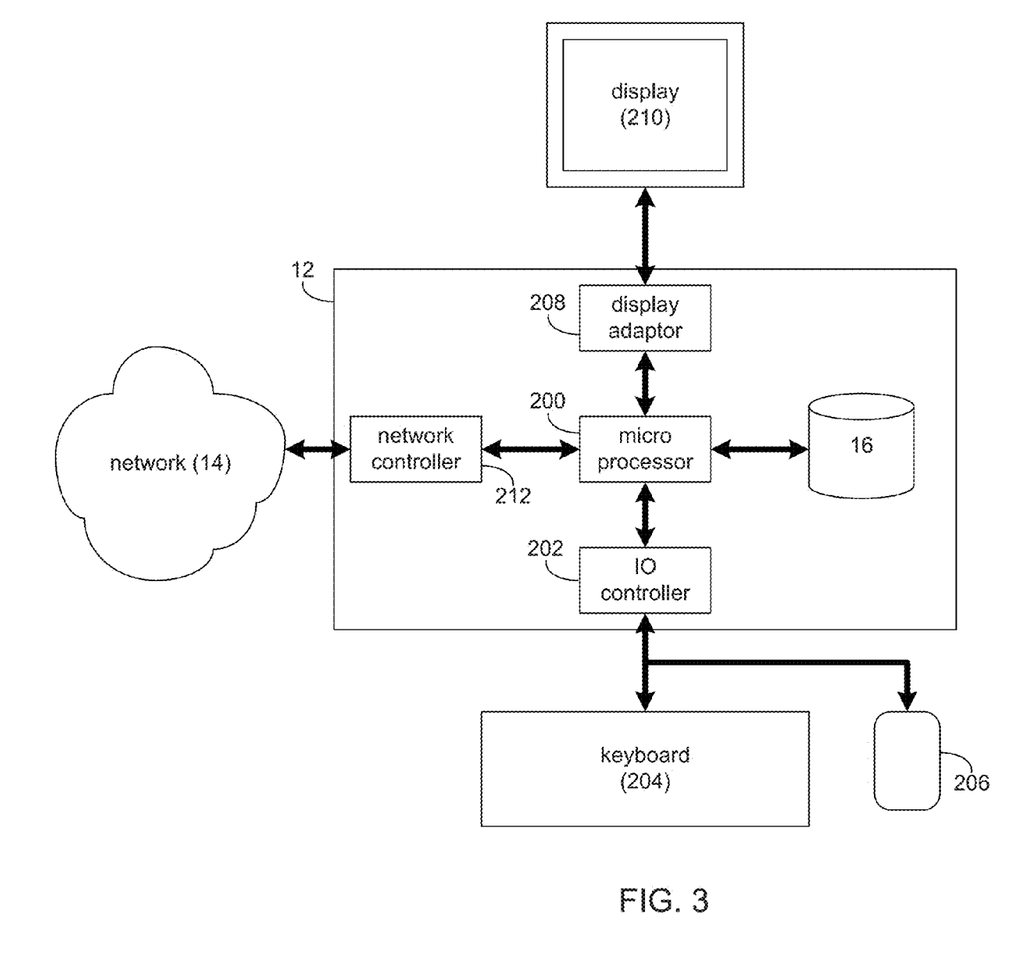
FIG. 3 is a diagrammatic view of the computing device of FIG. 1, according to an implementation of the present disclosure.

Referring also to FIG. 3, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, notification process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for notification process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:

defining, by a processor, a rules set associated with a user for participation in a multiparty communication thread within a collaboration application associated with the user to control when the user is notified of updates to the multiparty communication thread within the collaboration application, wherein defining the rules set includes identifying update consumption behavior associated with the multiparty communication thread for the user based upon, at least in part, monitoring how often and for how long a user spends accessing updates to the multiparty communication thread within the collaboration application;

evaluating, by the processor, a plurality of communications associated with the multiparty communication thread;

determining, by the processor, when a given communication associated with the multiparty communication thread satisfies one or more rules included within the rules set via analysis of textual and informational attributes; and delivering, by the processor, the given communication to the collaboration application associated with the user based upon, at least in part, a determining that the given communication satisfies the one or more rules, wherein the rules set is managed by the user as a receiving party, and based upon, at least in part, a role associated with the user.

2. The computer-implemented method of claim 1, wherein the rules set is based upon, at least in part, a user profile established for the user.

3. The computer-implemented method of claim 1, wherein the rules set is based upon, at least in part, a historical behavior pattern associated with the user for multiparty communication threads.

4. The computer-implemented method of claim 1, wherein the rules set is based upon, at least in part, a number of communications included within the multiparty communication thread.

5. The computer-implemented method of claim 1, wherein the rules set is based upon, at least in part, a time-wise aspect of the multiparty communication thread.

6. The computer-implemented method of claim 1, wherein the rules set is based upon, at least in part, an indication of a completion of an action associated with the multiparty communication thread.

7. A computer program product comprising a non-transitory computer-readable medium having a plurality of instructions stored thereon, which, when executed by a processor, cause the processor to perform operations comprising:
defining a rules set associated with a user for participation in a multiparty communication thread within a collaboration application associated with the user to control when the user is notified of updates to the multiparty communication thread within the collaboration application, wherein defining the rules set includes identifying update consumption behavior associated with the multiparty communication thread for the user based upon, at least in part, monitoring how often and for how long a user spends accessing updates to the multiparty communication thread within the collaboration application;
evaluating a plurality of communications associated with the multiparty communication thread;
determining when a given communication associated with the multiparty communication thread satisfies one or more rules included within the rules set via analysis of textual and informational attributes; and
delivering the given communication to the collaboration application associated with the user based upon, at least in part, a determining that the given communication satisfies the one or more rules,
wherein the rules set is managed by the user as a receiving party, and based upon, at least in part, a role associated with the user.

8. The computer program product of claim 7, wherein the rules set is based upon, at least in part, a user profile established for the user.

9. The computer program product of claim 7, wherein the rules set is based upon, at least in part, a historical behavior pattern associated with the user for multiparty communication threads.

10. The computer program product of claim 7, wherein the rules set is based upon, at least in part, a number of communications included within the multiparty communication thread.

11. The computer program product of claim 7, wherein the rules set is based upon, at least in part, a time-wise aspect of the multiparty communication thread.

12. The computer program product of claim 7, wherein the rules set is based upon, at least in part, an indication of a completion of an action associated with the multiparty communication thread.

13. A computing system comprising:
a processor device; and
a memory architecture coupled with the processor device;
wherein the processor device is configured for:
defining a rules set associated with a user for participation in a multiparty communication thread within a collaboration application associated with the user to control when the user is notified of updates to the multiparty communication thread within the collaboration application, wherein defining the rules set includes identifying update consumption behavior associated with the multiparty communication thread for the user based upon, at least in part, monitoring how often and for how long a user spends accessing updates to the multiparty communication thread within the collaboration application;
evaluating a plurality of communications associated with the multiparty communication thread;
determining when a given communication associated with the multiparty communication thread satisfies one or more rules included within the rules set via analysis of textual and informational attributes; and
delivering the given communication to the collaboration application associated with the user based upon, at least in part, a determining that the given communication satisfies the one or more rules,
wherein the rules set is managed by the user as a receiving party, and based upon, at least in part, a role associated with the user.

14. The computing system of claim 13, wherein the rules set is based upon, at least in part, a user profile established for the user.

15. The computing system of claim 13, wherein the rules set is based upon, at least in part, a historical behavior pattern associated with the user for multiparty communication threads.

16. The computing system of claim 13, wherein the rules set is based upon, at least in part, a number of communications included within the multiparty communication thread.

17. The computing system of claim 13, wherein the rules set is based upon, at least in part, a time-wise aspect of the multiparty communication thread.

* * * * *